United States Patent [19]

Manis et al.

[11] Patent Number: 4,902,955
[45] Date of Patent: Feb. 20, 1990

[54] PORTABLE BATTERY CHARGER

[76] Inventors: Donald R. Manis, 7968 Camberly Dr.; Lon C. Hammock, 4915 W. Emory Rd., both of Powell, Tenn. 37849

[21] Appl. No.: 264,859

[22] Filed: Oct. 31, 1988

[51] Int. Cl.⁴ .................... H02J 7/00; B65B 31/00
[52] U.S. Cl. .................................. 320/2; 141/38; 152/415; 439/504
[58] Field of Search ............ 320/2, 25, 26; 439/501, 439/504; 152/415; 141/38

[56] References Cited

U.S. PATENT DOCUMENTS

| | | | |
|---|---|---|---|
| 2,966,248 | 12/1960 | Armbruster | 320/2 X |
| 3,729,033 | 4/1973 | Bayerkohler | 141/38 X |
| 3,967,133 | 6/1976 | Bokern | 320/2 X |
| 4,161,682 | 7/1979 | Corvette | 320/2 |
| 4,443,751 | 4/1984 | Humphrey | 320/2 |
| 4,667,141 | 5/1987 | Steele | 320/2 |
| 4,776,766 | 10/1988 | Brent | 152/415 X |
| 4,798,233 | 1/1989 | Mooney | 152/415 X |

*Primary Examiner*—R. J. Hickey
*Attorney, Agent, or Firm*—Pitts and Brittian

[57] ABSTRACT

An improved portable battery charger (10) for boosting and charging automotive-type batteries. The battery charger (10) comprises rectifier means (34), an automotive-type battery (20), and an air compressor (24) powered by the battery (20) received within a charger housing (12). Positive and negative charging cables (30 and 28, respectively) are retractably received within first and second cable housings (14 and 16), respectively. The first and second cable housings are positioned adjacent oppositely disposed external walls of the charger housing (12) and are dimensioned such that the positive and negative charging clamps (76 and 70, respectively) may be slidably positioned over saddle notches (72) defined by the cable housings when the charging cables are fully retracted into the cable housings whereby the charging clamps (76 and 70) are physically isolated from each other by the charger housing 12, thereby preventing accidental contact between the clamps. When connected to a source of AC power, the rectifier means (34) provides a DC charging voltage to the battery (20). The charging cables are connected to the terminals of the battery (20) to permit the boosting or jump-starting of a vehicle with a dead battery when AC power is not conveniently available.

12 Claims, 5 Drawing Sheets

PORTABLE BATTERY CHARGER

DESCRIPTION

1. Technical Field

This invention relates to a portable battery charger and more particularly to one used for boosting and charging automobile and other vehicle batteries.

2. Background Art

Battery chargers for charging automotive-type batteries are well known in the art. Most prior art chargers have been relatively simple devices which include rectifier means for converting conventional AC power to a DC charging source, and cables for connecting the DC charging source to the battery to be charged. The cables are usually provided with clamps for securing the cables to the terminals of the battery being charged. These prior devices are fairly adequate for use in garages or relatively limited areas where AC power is conveniently available. However, they are less than satisfactory for use in such areas as automobile sales lots, parking lots and garages, and other areas where AC power is not conveniently available. Even when the battery to be charged or boosted can be accessed with the use of an extension cord, such use is plagued with problems of broken and tangled extension cords, power loss in the extension cord, and tripping hazards. (As used herein, the terms boost and jump-start are synonymous and refer to the procedure of electrically connecting a charged battery in parallel with the discharged battery of a vehicle to permit the starting of the vehicle.)

In most prior art battery chargers, the charging cables are wrapped around cleats or lugs provided on the housing of the charger during storage. The cables can become tangled, twisted, frayed, and otherwise damaged because of the inadequacies of this storage method. Further, these prior art chargers have the disadvantage of being susceptible to dangerous sparking caused by accidental touching of the clamps when power is connected to the charger.

One prior art battery charger, that described in U.S. Pat. No. 4,161,682, has attempted to overcome the disadvantages of the previous chargers described above. The device described in the cited patent includes a battery housed within a common housing of the battery charger which permits jump-starting of a vehicle having an excessively discharged battery, even when AC power is not conveniently available. The device of the cited patent also includes means for retracting the charging cables into separate compartments of the charger's housing when they are not in use. However, this device does not adequately deal with the problem of accidental touching of the charging clamps when power is supplied to the cables. In the device of the cited patent, the charging clamps extend vertically from the uppermost portion of the charger's housing with no obstruction between the two clamps to prevent one from being pushed or pulled into contact with the other. Further, because there is no physical obstruction between the two clamps, they could easily be accidentally shorted by a metal object such as a screwdriver or wrench.

The applicant is unaware of any prior art battery charger which includes a self-contained source of compressed air for pumping up automobile tires and the like. Such a feature is particularly advantageous in a charger used in such places as automobile sales lots, parking lots and garages, and other locations where neither AC power nor sources of compressed air are readily available.

Therefore, it is an object of the present invention to provide a portable battery charger for boosting and charging automotive-type batteries which is capable of jump-starting (i.e. providing sufficient power to crank the engine of) an automobile without the need of being connected to a source of AC power.

It is a further object of the present invention to provide a portable battery charger for boosting and charging automotive-type batteries which includes means for retractably storing the charging cables of such battery charger when they are not in use, thereby minimizing the damage to caused by the twisting, fraying, tangling, etc. of the cables.

It is another object of the present invention to provide a portable battery charger for boosting and charging automotive-type batteries which includes means for minimizing accidental contact between its charging clamps when power is applied to the cables.

It is yet another object of the present invention to provide a portable battery charger for boosting and charging automotive-type batteries which includes a self-contained source of compressed air for pumping up automobile tires and the like.

DISCLOSURE OF THE INVENTION

Other objects and advantages will be accomplished by the present invention which provides a portable battery charger for boosting and charging automobile and other vehicle batteries. The battery charger of the present invention comprises an upright housing containing a rectifier means, an automotive-type battery, and, in the preferred embodiment, a source of compressed air. The DC output of the rectifier means is electrically connected to the automotive-type battery. At least one wheel is secured to the housing proximate its lowermost portion for rollably engaging the ground or a floor.

Positive and negative charging/booster cables, each having proximal and distal end portions, are provided. An intermediate portion of the positive charging-/booster cable is retractably received within a cable housing secured to a vertical exterior wall of the charger's housing; an intermediate portion of the negative charging/booster cable is retractably received within a second cable housing secured to an opposite vertical exterior wall of the charger's housing such that the first and second cable housings are separated by the charger's housing. The proximal end portions of the positive and negative charger/booster cables extend into the charger housing through cooperating openings in the charger housing and first and second cable housings, respectively, and are connected to the positive and negative terminals, respectively, of the automotive-type battery.

The distal end portions of the positive and negative charging/booster cables extend through openings defined in an upper portion of the first and second cable housings, respectively, and are connected to positive and negative charging clamps, respectively, exterior of the cable housings. The first and second cable housings are each provided with a saddle notch over which the positive and negative charging clamps, respectively, may be positioned when not in use. The cable housings are dimensioned such that the saddle notches are physically isolated from one another by the charger housing, thereby preventing the charging clamps from accidentally coming into contact when not in use. In the preferred embodiment, retraction means are contained within each cable housing whereby most of the intermediate portion of the charging cables can be deployed out through the opening in the upper portion of the cable housings for charging or boosting an external battery, and then retracted back into the cable housing when not in use. The charging/booster cables are dimensioned such that the retraction means bottoms out (i.e. stops retracting) just as the charging clamps are positioned over the saddle notches of the cable housings, thereby minimizing stress at the points where the cables are connected to the charging clamps.

In the preferred embodiment, each of the first and second cable housings are provided with dual cable channels and retraction means, thereby providing a spare in each. One of the spares is used to retract and house the AC supply cord of the rectifier means; the other is used to retract and house an air hose which is connected at a proximal end portion to the internal source of compressed air, and which has at its distal end portion a fitting suitable for inflating automobile tires and the like.

BRIEF DESCRIPTION OF THE DRAWINGS

The above-mentioned features of the invention will become more clearly understood from the following detailed description of the invention read together wi drawings in which.

BEST MODE FOR CARRYING OUT THE INVENTION

Figure 1:
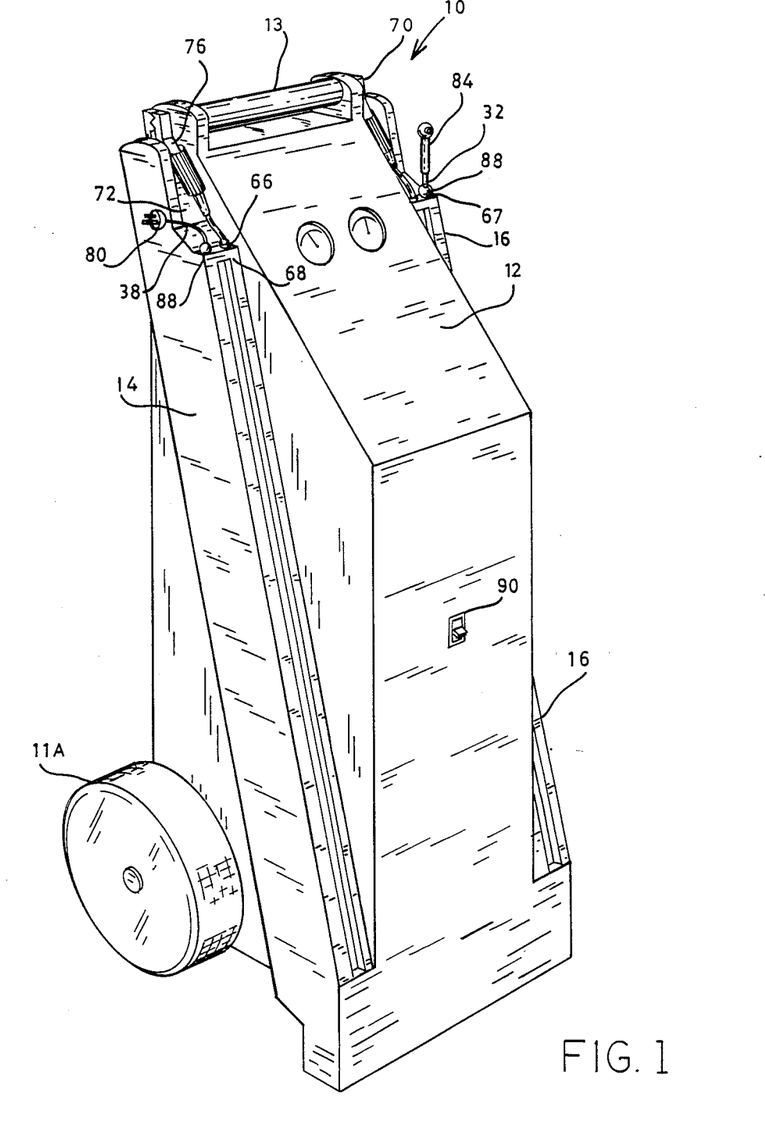
FIG. 1 illustrates a perspective view of a portable battery charger constructed in accordance with the various features of the present invention.

A portable battery charger incorporating various features of the invention is illustrated generally at 10 in the figures. Referring to FIG. 1, the battery charger 10 includes a charger housing 12 having wheels 11A and 11B secured to the housing 12 proximate its lowermost portion for rollably engaging the ground or a floor. In the preferred embodiment, a handle 13 is provided proximate the uppermost portion of the charger housing 12 to facilitate propelling the charger 10 to a desired location. The charger housing 12 is an elongated, substantially rectangular, upstanding box-like member having an internal cavity, indicated at 18 in FIG. 2. Substantially identical first and second cable housings 14 and 16, respectively, are positioned adjacent opposing exterior vertical walls 15 and 17, respectively, of the charger housing 12. It will be appreciated by those skilled in the art that the cable housings 14 and 16 may be separate housings secured to the charger housing 12, or, in the alternative, may be integrally constructed with the charger housing 12.

Figure 2:
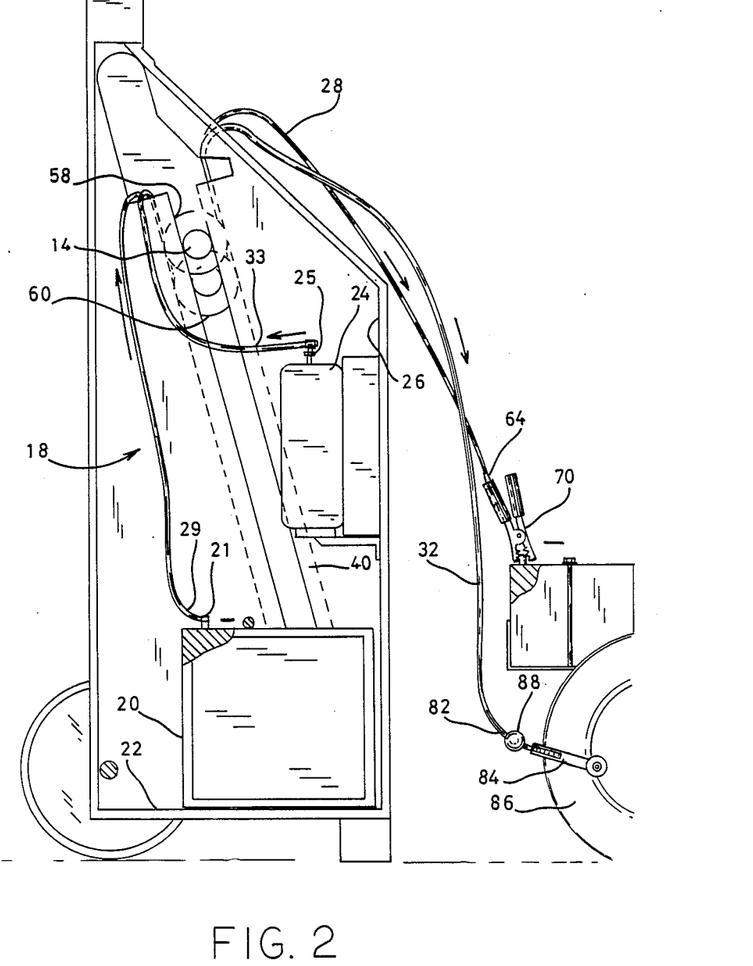
FIG. 2 illustrates a side elevation view, in section, of a portable battery charger constructed in accordance with the various features of the present invention.
Figure 3:
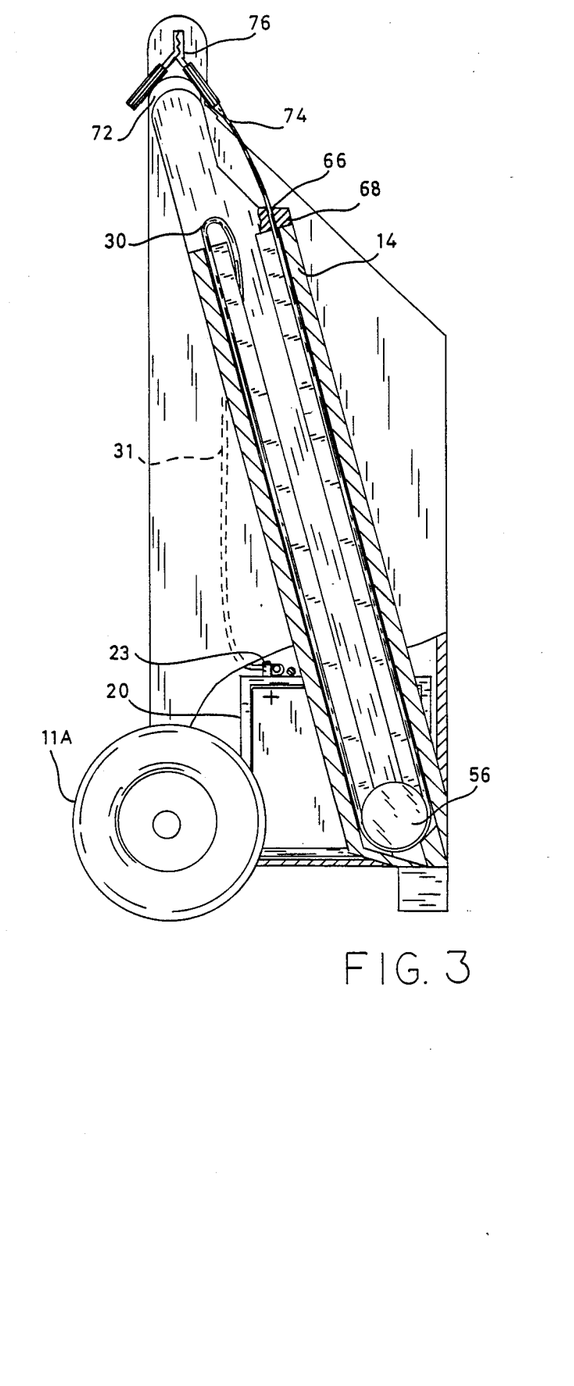
FIG. 3 illustrates a side elevation view, partially in section, of a portable battery charger constructed in accordance with the various features of the present invention.
Figure 4:
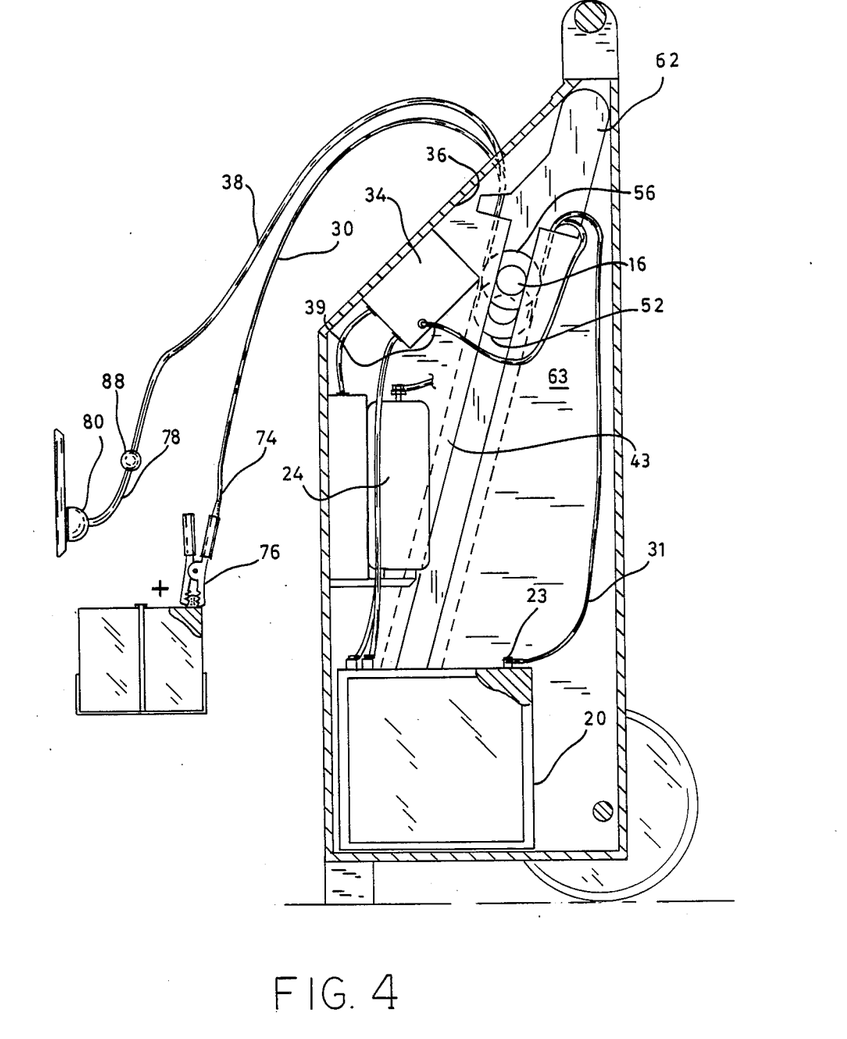
FIG. 4 illustrates a side elevation view, in section, of a portable battery charger constructed in accordance with the various features of the present invention.

Referring now to FIG. 2, contained within the internal cavity 18 defined by the charger housing 12 is an automotive-type battery 20. Preferably, the battery 20 is positioned on a floor or shelf 22 proximate the lowermost portion of the housing 12 to provide a low center of gravity to the device 10 for stability. A negative charging cable 28, having a proximal end portion 29 connected to the negative terminal 21 of the battery 20, is provided. Similarly, as shown in FIGS. 3 and 4, a positive charging cable 30, having a proximal end portion 31 connected to the positive terminal 23 of the battery 20, is also provided. Also contained within the cavity 18 is a source of compressed air which in the preferred embodiment is a battery powered air compressor 24 mounted on an interior wall 26 of the housing 12. An air hose 32, having a proximal end portion 33 connected to the output fitting 25 of the air compressor 24, is provided. Referring to FIG. 4, rectifier means 34 are contained within the cavity 18 of the charger housing 12 and are secured to an interior wall 36 thereof. It will be appreciated by those skilled in the art that the rectifier means 34 can be any of a number of conventional battery charging circuits of various capacities which convert AC power to a DC charging voltage. An AC supply cord 38, having a proximal end portion 39 connected to the input of the rectifier means 34, is provided.

Figure 5:
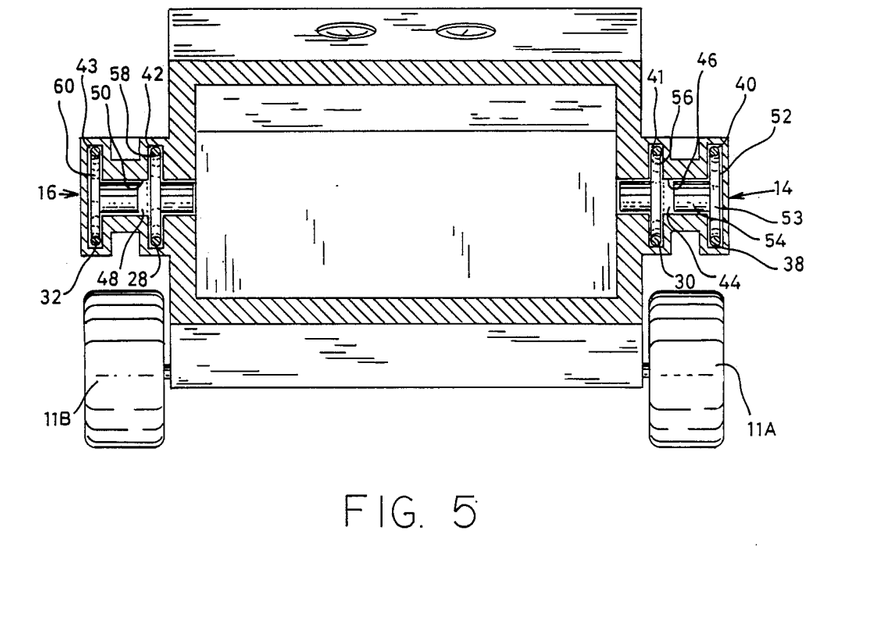
FIG. 5 illustrates a top view, in section, of a portable battery charger constructed in accordance with the various features of the present invention.

Referring now to FIGS. 5, a sectional top view of the portable battery charger 10 is illustrated. FIG. 5, when viewed with the other figures, illustrates retraction means contained within the cable housings 14 and 16. Channels 40 and 41 are defined by the first cable housing 14; similarly, channels 42 and 43 are defined by the second cable housing 16. The channels extend through substantially the length of the cable housings 14 and 16. A cooperating channel 44 which is perpendicular to the channels 40 and 41 is defined by the first cable housing 14 and the vertical wall section 46 of the charger housing 12; similarly, a cooperating channel 48 which is perpendicular to the channels 42 and 43 is defined by the second cable housing 16 and the vertical wall section 50 of the charger housing 12. A weighted member 52, having a wheel section 53 and a shaft section 54, is received within the void defined by the channel 40 and the cooperating channel 44; the wheel section 53 being closely received within the channel 40 with the shaft section extending into and being substantially received within the cooperating channel 44. Similarly, substantially identical weighted members 56, 58 and 60, each having a wheel section 53 and a shaft section 54, are received within the voids defined by the channel 41 and cooperating channel 44, the channel 42 and cooperating channel 48, and the channel 43 and cooperating channel 48, respectively. An intermediate portion of the positive charging cable 30 is looped underneath the wheel section 53 of the weighted member 56 such that the intermediate portion of the cable 30 is substantially received within the channel 41 when the weighted member is permitted to fall by gravity to the bottom of the channel 41. The proximal end portion 31 extends into the cavity 18 of the charger housing 12 through a void in the uppermost portion of the first cable housing 14 and a cooperating opening 62 in the vertical wall section 63 of the charger housing 12 where it terminates in an electrical connection to the positive terminal 23 of the battery 20 as previously described. The distal end portion 74 of the positive charging cable 30 extends through a bore 66 in an upper end portion 68 of the first cable housing 14 and terminates in an electrical connection to a positive charging clamp 76. The positive charging cable is dimensioned such that when the intermediate portion of the cable is fully retracted within the channel 41 of the first cable housing 14, i.e. the weighted member 56 is at the bottom of the channel 41, there is just enough of the distal end portion 74 of the cable 30 extending through the bore 66 to permit the handles of positive charging clamp 76 to be slidably positioned over the recessed surface of a saddle notch 72 provided in the exterior of the cable housing 14 proximate its upper end without the electrical connection between the distal end portion 74 and the charging clamp 76 being stressed by the retraction force exerted on the cable 30 by the weighted member 56. Referring to FIGS. 1 and 2, it can be seen that an intermediate portion of the negative charging cable 28 is similarly received within the channel 42 of the second cable housing 16 with the distal end portion 64 of the negative charging cable 28 terminating in a negative charging clamp 70. Referring to FIGS. 1 and 4, it can be seen that an intermediate portion of the AC power supply cord 38 is similarly received within the channel 40 of the first cable housing 14 with the distal end portion 78 of the power cord 38 terminating in a conventional electrical plug 80. Referring to FIGS. 1 and 2, it can be seen that an intermediate portion of the air hose 32 is similarly received within the channel 43 of the second cable housing 16 with the distal end portion 82 of the air hose 32 terminating in a fitting 84 suitable for inflating a vehicle tire 86 and the like. Referring to FIG. 1, it can be seen that the AC power supply cord 38 and the air hose 32 are provided with means 88 proximate their distal end portions 78 and 82, respectively, for arresting the retraction of such end portions into the channels 40 and 43, respectively. As illustrated, the means 88 can be a spherically shaped member secured to the cord/hose which has a larger diameter than the second bore 67 in the cable housings 14 and 16 through which the end portions extend. Means 88 of the type illustrated reduce stress on the plug 80 and the fitting 84.

Referring to FIG. 1, it can be seen that the cable housings 14 and 16 are dimensioned such that, when the charging clamps 76 and 70 are positioned over the saddle notches 72 of the cable housings 14 and 16, respectively, the charging clamps 70 and 76 are physically isolated from one another by the charger housing 12. This is an important feature of the present invention, because it minimizes the danger of sparking caused by the clamps 70 and 76 accidentally coming into contact with one another when the cables are in the stored position. It is almost impossible for the clamps to be accidentally pushed or pulled into contact with each other because of the physical obstruction provided by the charger housing 12. The obstruction provided by the charger housing 12 also minimizes the possibility of accidental shorting of the clamps by a metal object such as a screwdriver or a wrench.

Figure 6:
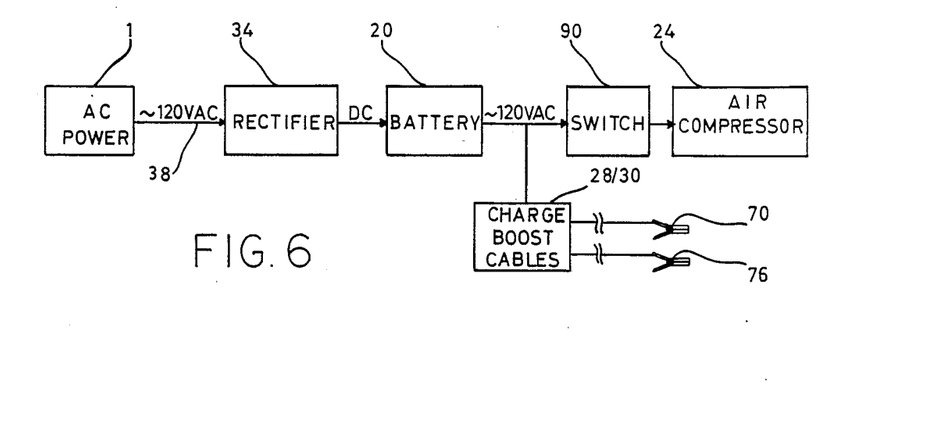
FIG. 6 illustrates a block diagram of the circuitry of a portable battery charger constructed in accordance with the various features of the present invention.

Referring to FIG. 6, a block diagram of the circuitry of the portable battery charger 10 is illustrated. AC power, indicated by the block 1, is supplied through a power supply cord 38, to a rectifier 34 comprising a battery charging circuit of conventional design, which converts the AC power to a DC charging voltage. The output of the rectifier 34 is connected to the automotive-type battery 20, thereby charging the battery 20 when the power supply cord 38 is plugged into a conventional AC outlet. DC power is selectively supplied to the air compressor 24 through switch means 90, a preferred location of which is shown in FIG. 1, by the battery 20. Negative and positive charging cables 28 and 30, respectively, are connected to the negative and positive terminals 21 and 23, respectively, of the battery 20. The charging cables 28 and 30 terminate in charging clamps 70 and 76 at their distal end portions.

In light of the foregoing, it will be appreciated that the present invention provides a portable battery charger for boosting and charging automotive-type batteries. The portable battery charger 10 can be wheeled to a vehicle disabled by a discharged battery. The disabled vehicle can be started by boosting its battery by connecting the positive and negative charging clamps 76 and 70, respectively, to the positive and negative terminals of the vehicle's discharged battery. The battery charger 10 can be used to charge an automotive-type battery by connecting the positive and negative charging clamps 76 and 70, respectively, to the positive and negative terminals, respectively, of the battery to be charged and plugging the AC supply cord 38 into an AC power outlet. Further, the battery charger 10 can be wheeled to a location where neither AC power nor compressed air are readily available and used to inflate a vehicle tire 86 or the like by connecting the fitting 84 to the tire 86 and turning on the air compressor 24 which is powered by the internal battery 20 of the battery charger 10. When not in use, the charging cables 28 and 30 are retracted into the cable housings 14 and 16 and the charging clamps 70 and 76 are isolated one from the other by the charger housing 12 to prevent dangerous sparking caused by accidental contact between the charging clamps.

While a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. A portable battery charger for boosting and charging automotive-type batteries comprising;

a charger housing;

an automotive-type battery received within said charger housing, said battery having a positive terminal and a negative terminal;

a first cable housing secured to said charger housing proximate a first vertical wall of said charger housing, said first cable housing having an upper portion defining a first bore and a first saddle notch disposed above said bore;

a second cable housing secured to said charger housing proximate a second vertical wall of said charger housing, said second vertical wall being oppositely disposed from said first vertical wall whereby said first and second cable housings are physically isolated one from the other by said charger housing, said second cable housing having an upper portion defining a second bore and a second saddle notch disposed above said second bore;

a positive charging cable having proximal and distal end portions, said proximal end portion being electrically connected to a positive terminal of said automotive-type battery, an intermediate portion of said positive charging cable being received through said first bore and retractably received within said first cable housing, said positive charging cable terminating at its said distal end portion external to said first cable housing;

a negative charging cable having proximal and distal end portions, said proximal end portion being electrically connected to a negative terminal of said automotive-type battery, an intermediate portion of said negative charging cable being received through said second bore and retractably received within said second cable housing, said negative charging cable terminating at its said distal end portion external to said second cable housing; and positive and negative charging clamps electrically connected to said distal end portions of said positive and negative charging cables, respectively, said positive and negative clamps each having a pair of rearwardly disposed, diverging handles for being releasably received in said first and second saddle notches, respectively, whereby said clamps are held in a preselected position when said intermediate portions of said positive and negative charging cables are fully received within said first and second cable housings.

2. The portable battery charger of claim 1 wherein said first and second cable housings further comprise cable retraction means received therein.

3. The portable battery charger of claim 2 wherein said retraction means comprises said cable housings defining an elongated substantially vertical channel therein, a weighted member closely received within said elongated channel, and said intermediate portion of said charging cables being looped under said weighted member whereby said weighted member exerts a force on said charging cables tending to retract said intermediate portion into said cable housing.

4. The portable battery charger of claim 3 wherein said weighted member comprises a wheel-like portion and a shaft portion, said shaft portion having a common axis with said wheel-like portion and said shaft portion having a smaller diameter than said wheel-like portion.

5. The portable battery charger of claim 1 further comprising a source of compressed air received within said charger housing, an air hose having proximal and distal end portions, said proximal end portion of said air hose being connected to said source of compressed air, and said distal end portion of said air hose terminating in a fitting for facilitating the inflation of vehicle tires and the like externally of said charger housing.

6. The portable battery charger of claim 5 wherein said source of compressed air is an air compressor powered by said automotive-type battery.

7. The portable battery charger of claim 1 wherein said first and second cable housings further comprise cable retraction means received therein.

8. The portable battery charger of claim 7 wherein said cable retraction means comprises said cable housings defining an elongated substantially vertical channel therein, a weighted member closely received within said elongated channel, and said intermediate portion of said charging cables being looped under said weighted member whereby said weighted member exerts a force on said charging cables tending to retract said intermediate portion in said cable housing.

9. The portable battery charger of claim 8 wherein said weighted member comprises a wheel-like portion and a shaft portion, said shaft portion having a common axis with said wheel-like portion and said shaft portion having a smaller diameter than said wheel-like portion.

10. A portable battery charger for boosting and charging automotive type batteries comprising:

a charger housing;

an automotive-type battery received within said charger housing, said battery having a positive terminal and a negative terminal;

a positive charging cable having proximal and distal end portions, said proximal end portion being electrically connected to said positive terminal of said automotive-type battery;

a negative charging cable having proximal and distal end portions, said proximal end portion being electrically connected to said negative terminal of said automotive-type battery;

positive and negative charging clamps electrically connected to said distal end portions of said positive and negative charging cables, respectively; and an air compressor mounted within said charger housing and powered by said automotive-type battery, said compressor being provided with an air hose having a proximal end portion connected to said compressor and a distal end portion terminating in a fitting for facilitating the inflation of vehicle tires.

11. A portable battery charger for boosting and charging automotive-type batteries comprising:

a charger housing;

rectifier means received within said housing, said rectifier means having a DC output;

an automotive-type battery received within said charger housing, said battery being electrically connected to said DC output of said rectifier means whereby said battery is supplied with a charging voltage when said rectifier means is approximately connected to an AC power source;

a first cable housing secured to said charger housing proximate a first vertical wall of said charger housing;

a second cable housing secured to said charger housing proximate a second vertical wall of said charger housing, said second vertical wall being oppositely disposed from said first vertical wall whereby said first and second cable housings are physically isolated one from the other by said charger housing;

a positive charging cable having proximal and distal end portions, said proximal end portion being electrically connected to a positive terminal of said automotive-type battery, an intermediate portion of said positive charging cable being retractably received within said first cable housing, said positive charging cable terminating at its said distal end portion externally of said cable housing and said charger housing;

a negative charging cable having proximal and distal end portions, said proximal end portion being electrically connected to a negative terminal of said automotive-type battery, an intermediate portion of said negative charging cable being retractably received within said second cable housing, said negative charging cable terminating at its said distal end portion externally of said cable housing and said charger housing;

positive and negative charging clamps electrically connected to said distal end portions of said positive and negative charging cables, respectively;

said first and second cable housings being dimensioned whereby said positive and negative charging clamps are physically isolated from each other by said charger housing when said intermediate portions of said positive and negative charging cables are fully received within said first and second cable housings, respectively, thereby preventing said charging clamps from accidentally coming into contact with one another while in a stored position; and a source of compressor air including an air compressor powered by said automotive-type battery, and an air hose having proximal and distal end portions, said proximal end portion of said air hose being connected to said air compressor and said distal end portion of said air house terminating in a fitting for facilitating the inflation of vehicle tires and the like externally of said charger housing.

12. The portable battery charger of claim 11 wherein said first and second cable housings further comprise notch-like portions over which said positive and negative charging clamps can be slidably positioned when not in use.

* * * * *